(12) United States Patent  
Chen et al.

(10) Patent No.: US 7,654,722 B2  
(45) Date of Patent: Feb. 2, 2010

(54) LIGHT GUIDE PLATE

(75) Inventors: Wei-Hsuan Chen, Kaohsiung (TW); Yi-Lin Tsai, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 11 days.

(21) Appl. No.: 11/877,671

(22) Filed: Oct. 24, 2007

(65) Prior Publication Data

US 2009/0109704 A1   Apr. 30, 2009

(51) Int. Cl.  
*F21V 7/04* (2006.01)

(52) U.S. Cl. .................. 362/619; 362/620; 362/628; 362/615

(58) Field of Classification Search .......... 362/600–630  
See application file for complete search history.

(56) References Cited

U.S. PATENT DOCUMENTS

| | | | |
|---|---|---|---|
| 6,950,155 B2 * | 9/2005 | Umemoto ................... | 349/61 |
| 7,156,546 B2 * | 1/2007 | Higashiyama ............... | 362/561 |
| 7,252,424 B2 * | 8/2007 | Hsu et al. ................... | 362/600 |
| 7,360,939 B2 * | 4/2008 | Sugiura ...................... | 362/620 |
| 7,401,962 B2 * | 7/2008 | Yamashita et al. .......... | 362/606 |
| 2006/0268576 A1 * | 11/2006 | Matsui et al. ............... | 362/613 |

* cited by examiner

*Primary Examiner*—Anabel M Ton  
(74) *Attorney, Agent, or Firm*—Leong C. Lei

(57) ABSTRACT

The wedge-shaped light guide plate has a number of reflection structures with gaps therebetween arranged along the light reflection plane. Each reflection structure from a previous gap contains sequentially a slant surface extended away from the light emission surface, a second reflection surface further slanting away from the light emission plane, and a first reflection surface slanting towards the light emission plane to connect to a next gap. The second and first reflection surfaces form a prism element. In one embodiment of the present invention, the reflection structures are more densely arranged as they are more distant from the light source. In an alternative embodiment of the present invention, the reflection structures are arranged uniformly.

5 Claims, 5 Drawing Sheets

LIGHT GUIDE PLATE

TECHNICAL FIELD OF THE INVENTION

The present invention generally relates to light guide plates, and more particularly to a light guide plate having an array of reflection structures along a reflection plate of the light guide plate.

DESCRIPTION OF THE PRIOR ART

A back light module for a liquid crystal display (LCD) panel should deliver illumination with an appropriate uniformity and brightness for the LCD panel to produce high-quality images.

FIG. 1 shows the structure of a conventional back light module. As illustrated, the back light module 1 contains a linear light source 15, a light guide plate 11, a reflector 12, a prism film 13, and a diffuser film 14.

The light guide plate 11 has a wedge-like shape with a light incidence plane 111, a light reflection plane 112, and a light emission plane 113. The light source 15 emanates light beams into the light guide plate 11 via the light incidence plane 111. The light reflection plane 112 is slant for about 2 degrees for reflecting the incident light beams towards the light emission plane 113 where the reflected light beams exit the light guide plate 11.

The surface of the light reflection plane 112 is configured with a large number of aligned reflection structures 1121. The reflection structures 1121 are more densely arranged as they are positioned farther away from the light source 15 so as to achieve better uniformity. The emitted light beams from the light guide plate 11 are then collimated by the prism structures 131 of the prism film 13 to achieve better brightness.

As shown in FIG. 2, the V-shaped reflection structure 1121 provides a wider first reflection surface 1121a and a narrower second reflection surface 1121b with an included angle therebetween from 1 to 5 degrees, which to some extent cancels the slant of the reflection plane 12. Please note that, between a reflection structure 1121's second reflection surface 1121b and a next reflection structure 1121's first reflection surface 1121a, there is a flat gap (not numbered). When the light beams from the light source 15 hit the first reflection surface 1121a, they are incident at an angle less than a critical angle and the light beams undergo a number of total reflections by the first reflection surface 1121a and the light emission plane 13. The light beams therefore travel along the light guide plate 11 away from the light source 15. On the other hand, when the light beams from the light source 15 hit the flat gap, the light beams are reflected to penetrate slantwise through the light emission plane 13 at an angle. As to the light beams hitting the second reflection surface 1121b, they are reflected to penetrate the light emission plane 13 perpendicularly.

As the reflection structures 1121 are arranged so that they are more scarcely positioned as they are closer to the light source 15, the flat gaps there have a larger total area. On the other hand, there are a less number of first reflection surfaces 1121a. The joint effect is that more light beams are reflected to penetrate slantwise the light emission plane 13 and less light beams undergo total reflections to propagate away from the light source 15.

In contrast, as the reflection structures 1121 are arranged so that they are more densely positioned as they are farther away from the light source 15, the flat gaps are much narrower but there are a larger number of first reflection surfaces 1121a. The joint effect is that much less light beams are reflected to penetrate slantwise the light emission plane 13 and more light beams undergo total reflections to propagate away from the light source 15.

The net result is that, in a region that is close to the light source 15, too many light beams are reflected to penetrate slantwise the light emission plane 13 while, in a region that is distant to the light source 15, too much light beams undergo total reflections and are constrained in the light guide plate 11. The overall performance of the conventional light guide plate 11 is therefore actually less than satisfactory.

SUMMARY OF THE INVENTION

The primary purpose of the present invention is to provide a novel light guide plate to achieve a relatively uniform overall brightness performance in terms of the perpendicular light beams emitted from the light guide plate.

The wedge-shaped light guide plate has a number of reflection structures with gaps therebetween arranged along the light reflection plane. Each reflection structure from a previous gap contains sequentially a slant surface extended away from the light emission surface, a second reflection surface further slanting away from the light emission plane, and a first reflection surface slanting towards the light emission plane to connect a next gap. The second and first reflection surfaces form a prism element.

In one embodiment of the present invention, the reflection structures are arranged so that they are more densely positioned as they are more distant from the light source of the light guide plate. However, for each reflection structure, the ratio of the projected length (on the light emission plane) of the reflection structure's slant surface and its preceding gap to the projected length (on the light emission plane) of the reflection structure and its preceding gap is a constant. As such, both the gaps and their subsequent slant surfaces are extended longer as they are closer to the light source.

In an alternative embodiment of the present invention, the reflection structures are arranged uniformly but the heights of the prism elements (relative to the light reflection plane) are shorter as the reflection structures are closer to the light source. As such, the first reflection surfaces are smaller as they are closer to the light source.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
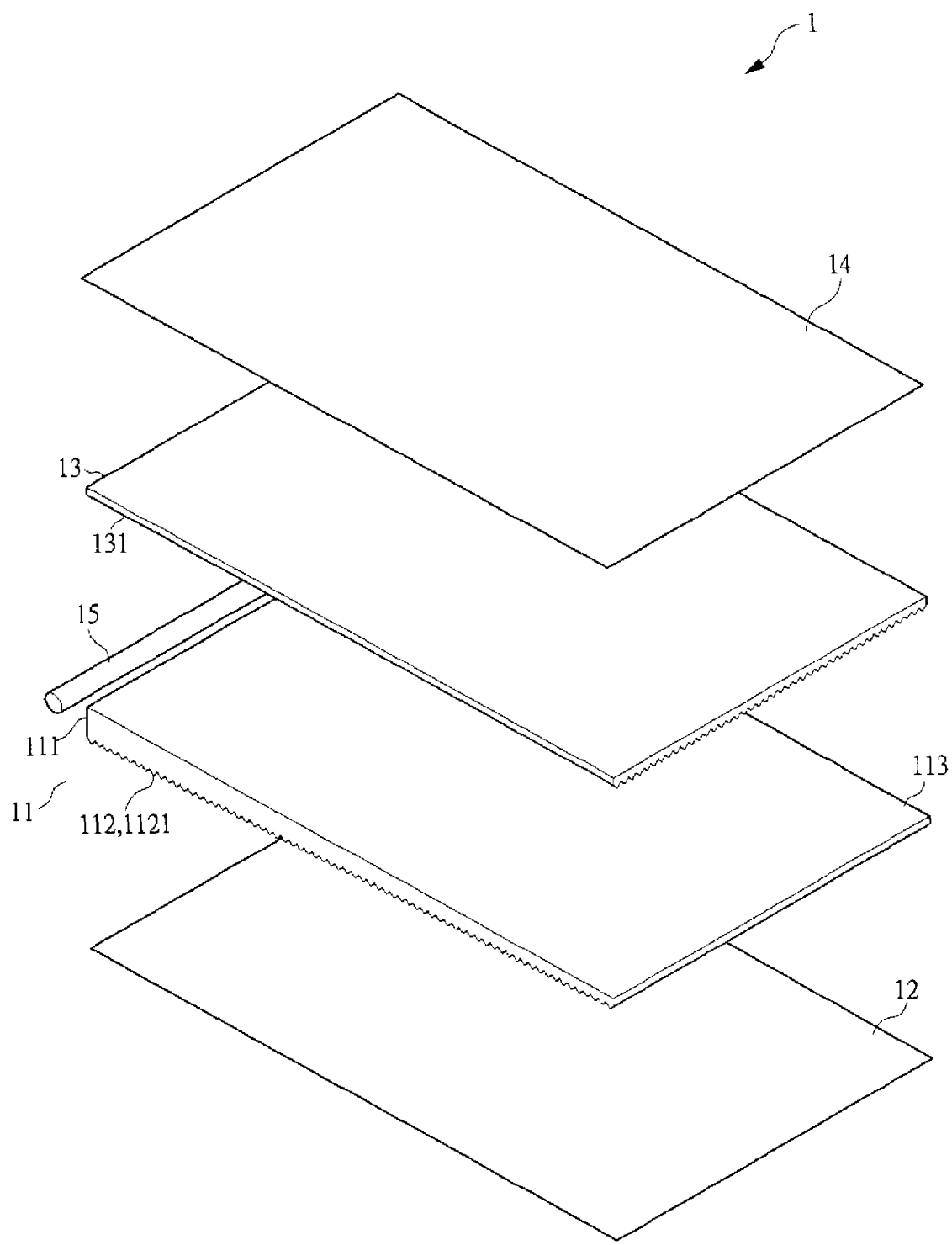
FIG. 1 is a perspective view showing the various components of a conventional backlight module.
Figure 2:
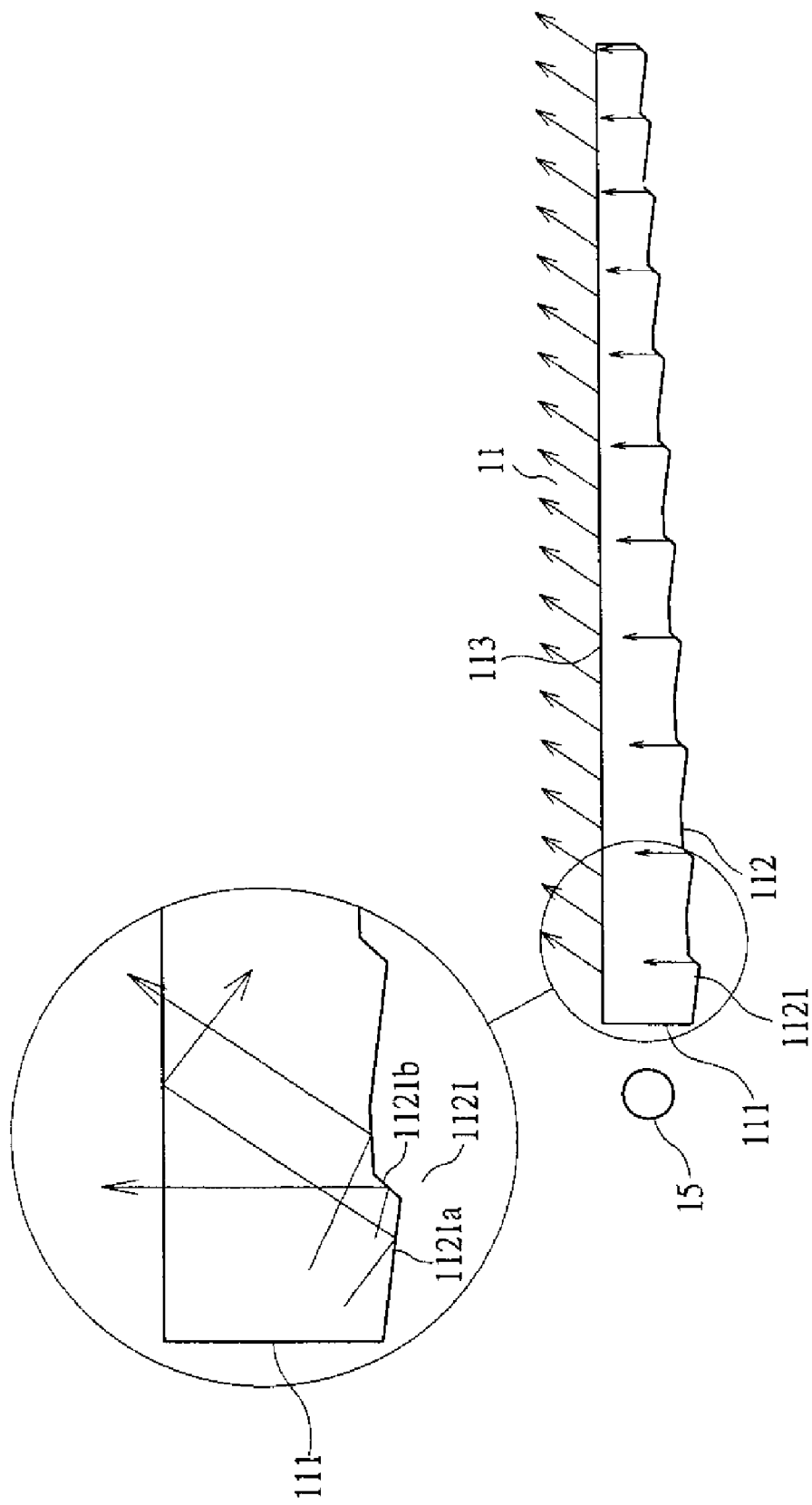
FIG. 2 is a sectional diagram showing the light trajectory of a conventional light guide plate.
Figure 3:
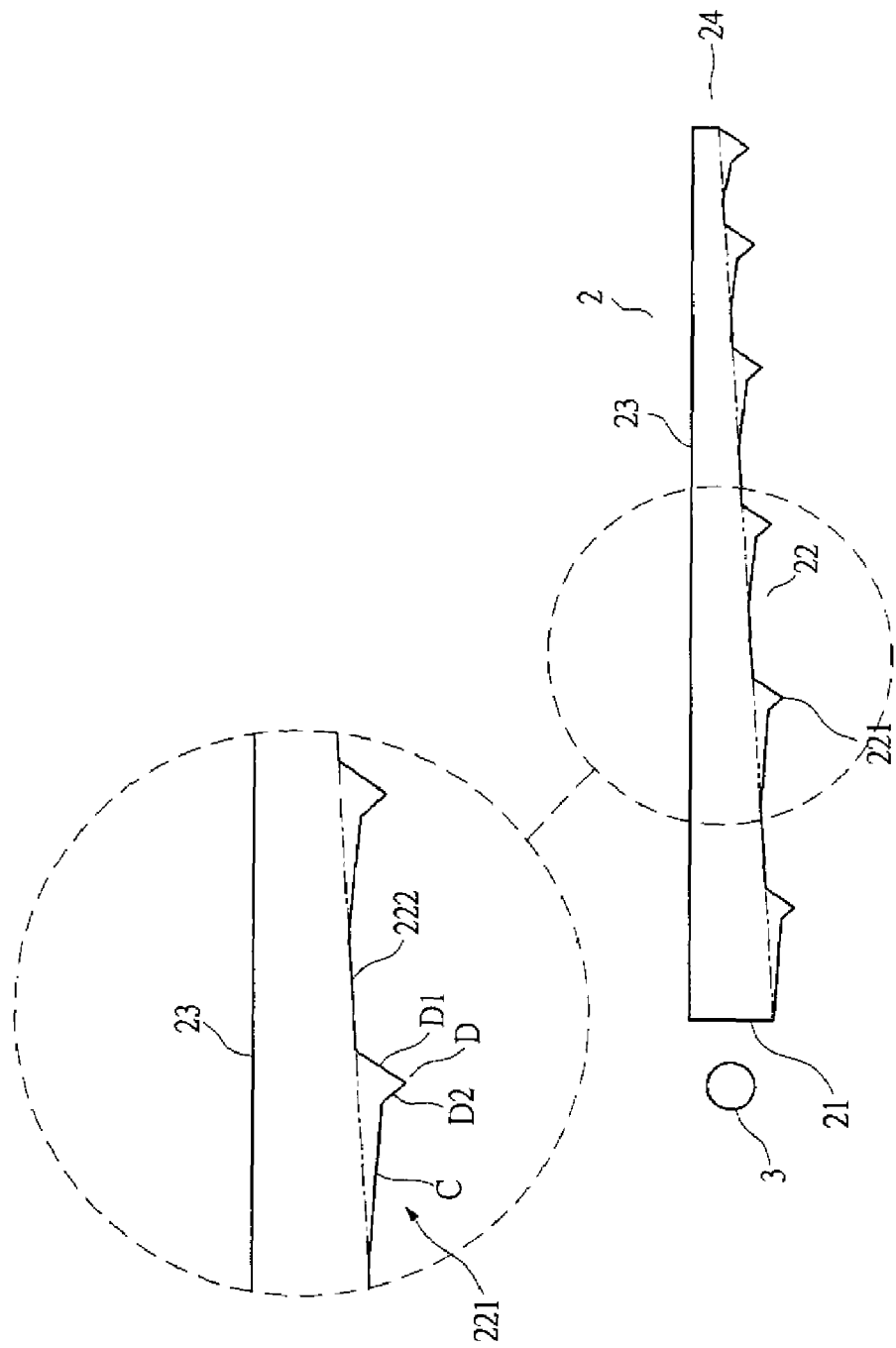
FIG. 3 is a sectional diagram showing a light guide plate according a first embodiment of the present invention.
Figure 4:
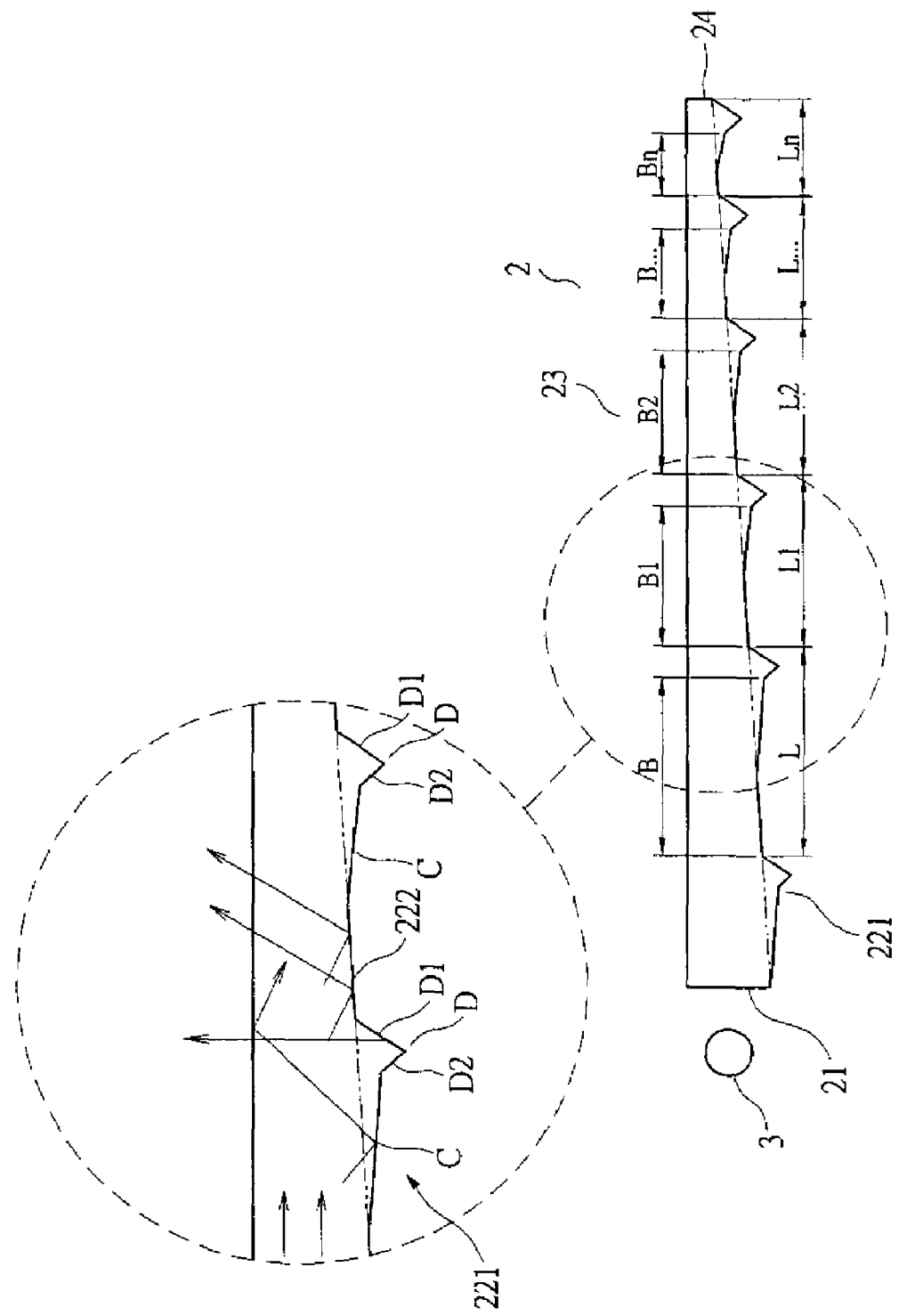
FIG. 4 is a sectional diagram showing the light trajectory of the light guide plate of FIG. 3.

As shown in FIGS. 3 and 4, a light guide plate 2 according to a first embodiment of the present invention has a wedge-like body made of a substantially transparent material. The light guide plate 2 has a light incidence plane 21, a light reflection plane 22, a light emission plane 23, and a terminal plane 24 opposite to the light incidence plane 21. A light source 3 is positioned adjacent to the light incidence plane 21 and emanates light beams into the light guide plate 2 via the light incidence plane 21. The light reflection plane 22 is extended from the light incidence plane 21 to the terminal plane 24, and is slant towards the light emission plane 23. The light reflection plane 22 has a number of reflection structures 221 aligned and parallel to the light incidence plane 21. Between every two adjacent reflection structures 221, there is a gap 222 therebetween. From the viewpoint of the light source 3, each reflection structure 221 contains a slant surface C followed by a prism element D. The slant surface C is extended from a previous gap 222 and slant away from the light emission plane 23. The prism element D contains a first reflection surface D1 and a second reflection surface D2. The second reflection surface D2 is adjacent to the slant surface C and slants further away from the light emission plane 23; the first reflection surface D1, on the other hand, is adjacent to the second reflection surface D2 and slants towards the light emission plane 23 to join to a subsequent gap 222.

The reflection structures 221 are configured such that the reflection structures 221 are more densely positioned as they are farther away from the light source 3. In other words, there are a less number of reflection structures 221 and, therefore, the gaps 222 and the slant surfaces C are longer as they are closer to the light source 3. On the other hand, there are a larger number of reflection structures 221 and, therefore, the gaps 222 and the slant surfaces C are shorter as they are more distant from the light source 3.

More specifically, the present invention requires that the reflection structures 221 are configured such that the following equation is satisfied:

$$\frac{B}{L} = \frac{B1}{L1} = \frac{B2}{L2} = \ldots = \frac{Bn}{Ln}$$

In the equation, L, L1, L2, ..., Ln are the projected lengths (on the light emission plane 23) of the reflection structures 221 and their preceding gaps 222, respectively, from the light incidence plane 21 towards the terminal plane 24. On the other hand, B, B1, B2, ..., Bn are also the projected lengths (on the light emission plane 23) of the reflection structures 221's slant surfaces C and their preceding gaps 222, respectively, from the light incidence plane 21 towards the terminal plane 24.

As such, as the light beams from the light source 3 enter the light guide plate 2, the light beams hitting the gap 222 are reflected to penetrate slantwise through the light emission plane 23 at an angle; the light beams hitting the slant surface C undergo total reflections to propagate towards the terminal plane 24; and the light beams hitting the first reflection surfaces D1 are reflected to penetrate through the light emission plane 23 perpendicularly.

For reflection structures 221 arranged to satisfy the foregoing equation, the gaps 222 are longer as they are closer to the light source 3, and more light beams are reflected and penetrate slantwise through the light emission plane 23 at an angle. However, as the slant surfaces C are also longer as they are closer to the light source 3, more light beams also undergo total reflections to propagate towards the terminal plane 24. This constitutes an inhibition effect to the reflected light beams penetrating the light emission plane 23 at an angle. On the other hand, as the gaps 222 are shorter as they are closer to the terminal plane 24, less light beams are reflected to penetrate slantwise through the light emission plane 23 at an angle. Similarly, as the slant surfaces C are also shorter as they are closer to the terminal plane 24, less light beams undergo total reflections to propagate towards the terminal plane 24.

Accordingly, in a region that is close to the light source 3, even though more light beams are reflected to penetrate slantwise the light emission plane 23, there are also more light beams to undergo total reflections to propagate along the light guide plate 2. Similarly, in a region that is distant from the light source 3, even though less light beams are reflected to penetrate slantwise the light emission plane 23, there are also less light beams that undergo total reflections to propagate along the light guide plate 2. As such, the light guide plate 2 provides a relatively uniform overall brightness performance in terms of the perpendicular light beams emitted from the light guide plate 2.

Figure 5:
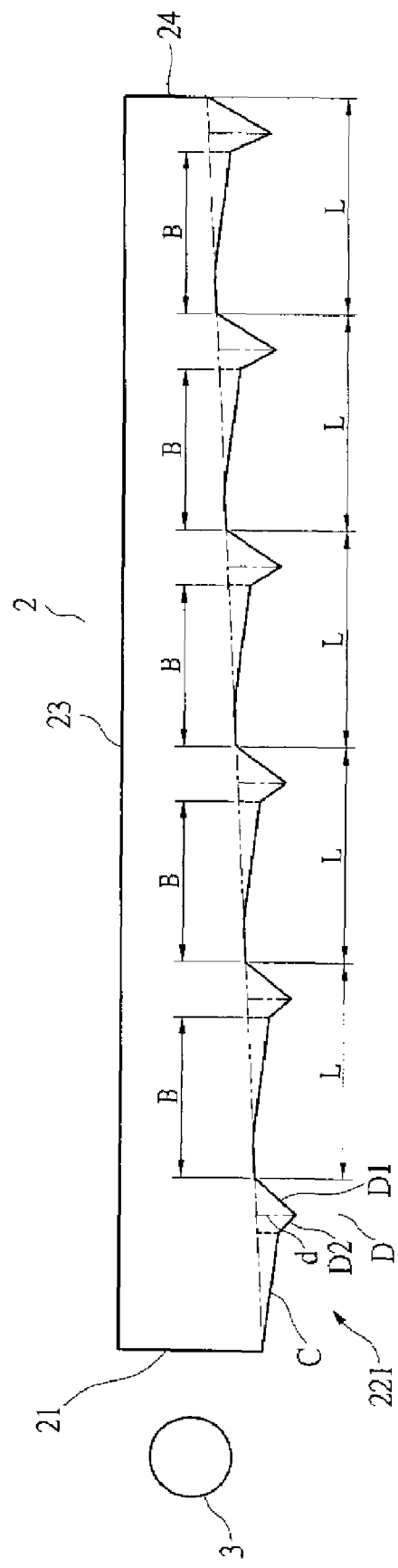
FIG. 5 is a sectional diagram showing a light guide plate according a second embodiment of the present invention.

FIG. 5 is a sectional diagram showing a light guide plate according a second embodiment of the present invention. In the present embodiment, the reflection structures 221 are arranged along the reflection plane 22 uniformly. In other words, the gaps 222 between very two adjacent reflection structures 221 are of the same length. However, the heights d of the prism elements D (measured from where the first and second reflection surfaces D1 and D2 meet to the light reflection plane 22) are shorter as the prism elements D are closer to the light source 3, and the heights d of the prism elements D are larger as the prism elements D are more distant from the light source 3.

When the height d of a prism element D is small (or large), the area of the first reflection surface D1 is also small (or large). Therefore, in a region that is close to the light source 3, a less number of light beams are reflected to penetrate the light emission plane 23 perpendicularly while, in a region that is distant from the light source 3, a larger number of light beams are reflected to penetrate the light emission plane 23 perpendicularly. As such, again, the light guide plate 2 provides a relatively uniform overall brightness performance in terms of the perpendicular light beams emitted from the light guide plate 2.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A light guide plate, comprising:
   a wedge-like body having a light incidence plane next to a light source, a terminal plane opposite to said light incidence plane, a light emission plane extended between said light incidence plane and said terminal plane, and a light reflection plane opposite to and slanting towards said light emission plane; and
   a plurality of reflection structures protruding outward from said light reflection plane wherein a gap is provided between every two adjacent reflection structures; each reflection structure has a slant surface extended from a previous gap and slanting away from said light emission plane, a second reflection surface extended from said slant surface and slanting further away from said light emission plane, and a first reflection surface extended from said second reflection surface and slanting towards said light emission plane to connect to a subsequent gap; and said first and second reflection surfaces form a prism element having a height relative to said light reflection plane;
   wherein said heights of said prism elements are larger as said prism elements are positioned farther away from said light source.

2. The light guide plate according to claim 1, wherein said reflection structures are more densely arranged by reducing at least the lengths of said gaps as said reflection structures are positioned farther away from said light source.

3. The light guide plate according to claim 2, wherein for each reflection structure, the ratio of the projected length on the light emission plane of said reflection structure's said slant surface and a preceding gap to the projected length on the light emission plane of said reflection structure and said preceding gap is a constant.

4. The light guide plate according to claim 2, wherein said reflection structures are more densely arranged by reducing at least the lengths of said gaps and said slant surfaces as said reflection structures are positioned farther away from said light source.

5. The light guide plate according to claim 1, wherein said reflection structures are arranged uniformly across said light reflection plane.

* * * * *